(12) United States Patent
Ellington, Jr. et al.

(10) Patent No.: US 6,944,291 B1
(45) Date of Patent: Sep. 13, 2005

(54) SYSTEM INCLUDING AN ALTERNATE POWER SOURCE FOR A MODEM-CAPABLE COMPUTER

(75) Inventors: William Woollcott Ellington, Jr., Raleigh, NC (US); Francis Edward Noel, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,579

(22) Filed: Feb. 19, 1999

(51) Int. Cl.[7] ............................................... H04M 3/00
(52) U.S. Cl. ............. 379/413; 379/413.02; 379/413.03
(58) Field of Search ........................... 379/413, 413.02, 379/413.03

(56) References Cited

U.S. PATENT DOCUMENTS

| | | | |
|---|---|---|---|
| 4,733,389 A * | 3/1988 | Puvogel ...................... | 370/200 |
| 4,961,220 A | 10/1990 | Tentler et al. ............... | 379/413 |
| 5,418,891 A | 5/1995 | Yang ........................... | 395/114 |
| 5,553,138 A | 9/1996 | Heald et al. ................. | 379/413 |
| 5,574,256 A | 11/1996 | Cottone ....................... | 174/53 |
| 6,115,468 A * | 9/2000 | De Nicolo ................... | 379/413 |
| 6,643,566 B1 * | 11/2003 | Lehr et al. ................... | 700/286 |

FOREIGN PATENT DOCUMENTS

| WO | WO9504318 | 2/1995 | ............. G06F 1/00 |
|---|---|---|---|

* cited by examiner

*Primary Examiner*—Jefferey F. Harold
(74) *Attorney, Agent, or Firm*—Joseph P. Lally; Martin J. McKinley

(57) ABSTRACT

Vehicles such as airliners or trains can be equipped with a form of local area network in which individual network connections are made to individual passenger seats using standard telephony connectors. Passengers having computers can connect to the network using their own conventional telephone cables. Wireless communications technology is used to link the vehicle network to external ground stations or satellite systems. To meet the DC power requirements of mobile computer users, the vehicle includes a DC power source. A normally unused wire-pair in the telephony connectors brings the DC power to each seatback. A slightly modified connector is used to transfer the DC power to the computer's DC power subsystem.

4 Claims, 3 Drawing Sheets

SYSTEM INCLUDING AN ALTERNATE POWER SOURCE FOR A MODEM-CAPABLE COMPUTER

FIELD OF THE INVENTION

The present invention relates to computers and more particularly to an alternate power source for modem-capable, ordinarily-mobile computers.

BACKGROUND OF THE INVENTION

Early personal computers were desktop systems which were so heavy and so bulky that it was assumed they would be left in place once installed. However, the benefits of a transportable personal computer were recognized early on and considerable efforts have been made to develop lighter and more portable computers. The advent of new technologies has permitted the development of newer, smaller and lighter personal computers which are known by various names, such as notebook computers, laptop computers or even palmtop computers, depending on their relative size. Personal computers are now light enough and small enough that they can be carried as hand luggage and can be used almost anywhere, including the confines of most airline seats. Computers of this type are referred to generically as mobile computers in the following specification.

Some users, having acquired a mobile computer small enough and light enough to carry on an airplane, want to be able to use that computer for the duration of even long flights either in a standalone mode and/or to stay "in touch" with others. Some airlines are considering accommodating such users by installing what amounts to a local area network (LAN) in some of their airplanes. At least a limited number of the seats in the airplane would be connected to the LAN through standard telephone connections, including a standard telephone jack such as the RJ45 jack widely used throughout the United States and in some other countries. The LAN would include a server or base station which could be used to establish radio communications with ground-based stations or satellite systems. An authorized mobile computer user would access the LAN simply by plugging his modem telephone cable into an RJ45 jack located in an armrest or in the seatback or bulkhead ahead of him or her.

While the existence of an airplane LAN and the ability to connect to that LAN through standard telephony connections at an airplane seat will enable a mobile computer user to stay "in touch" with the outside world, that user will remain "in touch" only until his or her computer battery becomes discharged.

Even with the best battery technology currently available, it is not possible to operate most mobile computers for extended periods of time on battery power alone. Experienced travelers have attempted to avoid the problems of exhausted batteries by carrying spare batteries or even using the AC power outlet found in some airplane lavatories. Neither of these solutions is particularly appealing. Spare batteries are heavy and hard to install, particularly in the limited seating space available in most airplanes. An airplane lavatory is certainly not an ergonomically sound working environment and, in any event, is available on an extended basis only to a traveler who is willing to be totally indifferent to the discomfort of his or her fellow travelers.

SUMMARY OF THE INVENTION

The present invention is an alternate power source for a modem-capable computer that can meet the needs of a computer-using traveler during long flights (or long ground vehicle trips) provided the vehicle is one of the type including a data network using standard telephony connectors for data distribution to users. The alternate power source is for use with any computer having a DC power subsystem and a modem which can be connected to such a data network through a multi-wire telephone connector having at least one available pair of wires. The alternate power source includes a pair of electrical leads which are connected at one end to the available pair of wires and which are coupled at the other end to an electrical interface to the DC power subsystem of the computer.

BRIEF DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DESCRIPTION OF PREFERRED EMBODIMENTS

Figure 1:
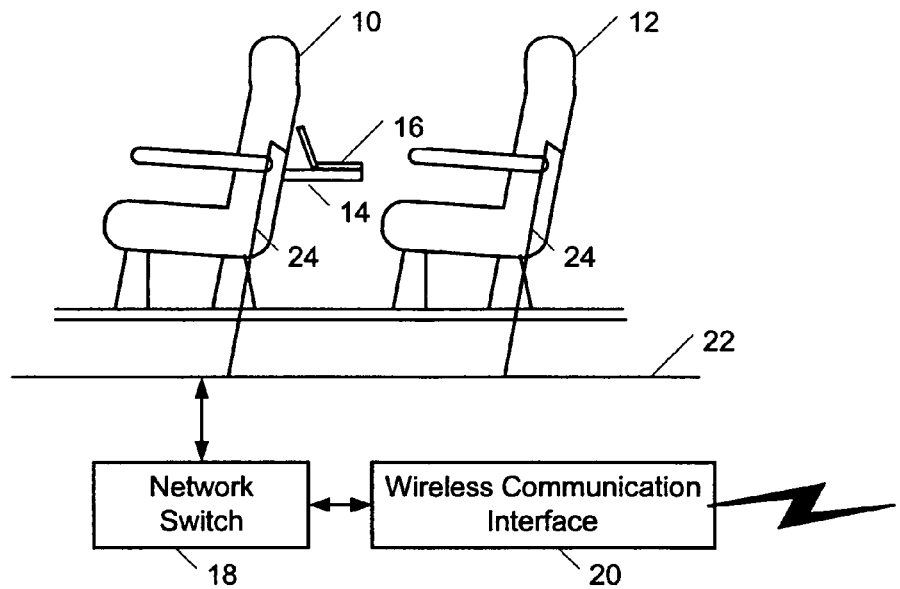
FIG. 1 is a simplified representation of a portion of vehicle interior, such as an airplane, including an internal network and wireless communications capabilities.

FIG. 1 is intended to show a portion of a vehicle interior. For the sake of convenience, the vehicle will be referred to as an airliner although it could be any kind of air, land or water vehicle equipped with the elements described below. Two passenger seats 10 and 12 are shown. The passenger seats are conventional to the extent they include fold-down tray tables, such as tray table 14, which passengers can use for food service and to support books, papers or even a mobile computer, such as mobile computer 16.

The passenger seats are unconventional in that they are equipped with wires 24 leading to a network switch 18 located in a non-passenger area of the airliner. Network switch 18 is itself connected to a wireless transceiver 20 which can both send data to and receive data from ground stations (not shown) or satellites (also not shown) linked to terrestrial data networks. In a preferred type of implementation, a shared, media 22 is used to interconnect the individual seatback wires 24 to the network switch 18, although direct connections between each seat and the network switch are well within the scope of the present invention.

To make the system useful to as many travelers as possible, standard telephony connections are employed at each seatback since a standard modem-capable mobile computer is routinely equipped with a standard telephone cable which can be used to complete a data connection between a standard telephone jack on the mobile computer and a standard telephone wall jack leading to a private or public switched telephone network. In the illustrated environment, the seatback jack takes the place of a wall jack and the network switch takes the place of the switched telephone network.

While the described environment can satisfy a traveler's desire to get "in touch" with others during even long airline flights, the traveler nevertheless can stay in touch only so long as his mobile computer battery (or batteries) retain a sufficient charge.

Figure 2:
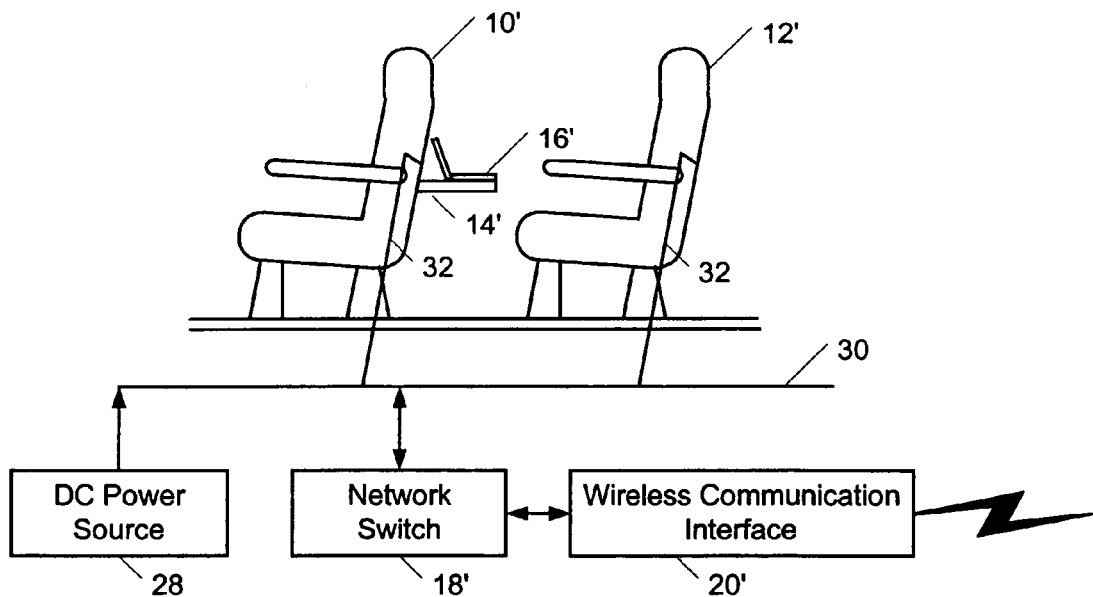
FIG. 2 is a similar representation of the same vehicle interior modified to support use of the present invention.

Referring to FIG. 2, to eliminate the dependence of the traveler on battery power, the present invention requires that the described environment be modified by including a low voltage (12 volts or less) DC power source 28 in the airliner. As will be described in more detail below, the DC power source 28 can be used to provide DC power to mobile computer users through a media 30 and individual seatback connections 32. Many of the elements shown in FIG. 2 are substantially unchanged from the form they have in the FIG. 1 environment, which is indicated by the use of primes with certain of the reference numbers. The media 30 and seatback connections 32 are designated by new reference numbers to indicate that they perform new functions in the FIG. 2 environment.

Figure 3:
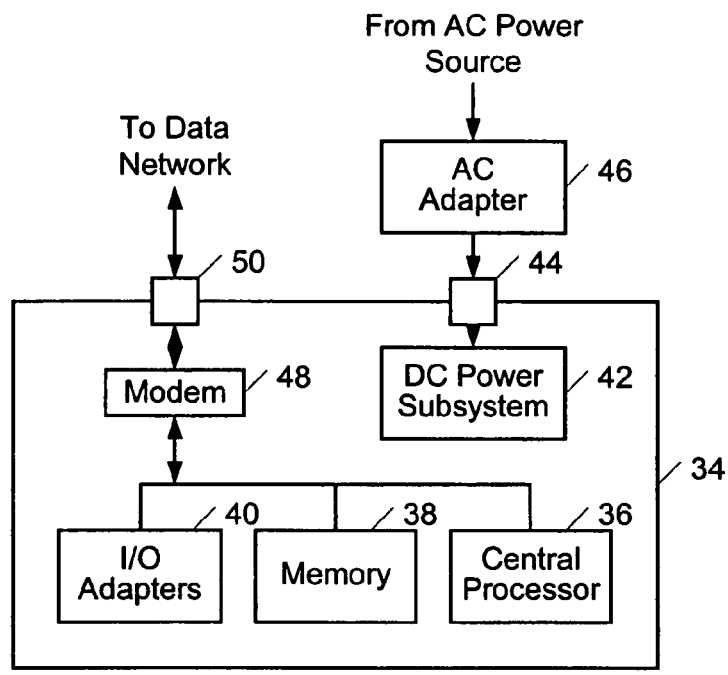
FIG. 3 is a block diagram of a conventional computer system showing conventional external connections both to an external data network and to an external AC power source.

FIG. 3 is a block diagram of a standard mobile computer 34 which can be used in implementing the present invention. The computer is conventional in that it includes a central processor 36, memory elements 38, input/output (I/O) adapters 40 and a DC power subsystem 42. While a conventional desktop system usually includes a three-prong jack for receiving a grounded 110 volt power plug, a mobile system usually has a removable DC power plug 44 connected to an AC adapter 46. Typically, the DC power provided by the AC adapter 46 is used both to power the mobile computer system and to restore the charge on a rechargeable battery (not shown) within the DC power subsystem 42.

It is common to include a modem 48 in a mobile computer either as an integral permanent component or in the form of a pluggable component such a modem complying with the requirements of a known standard such as the PCMCIA standard. Most modems, whether fixed or pluggable, are terminated externally using a standard telephony connector 50 such as the ubiquitous RJ45 telephone jack.

Figure 4:
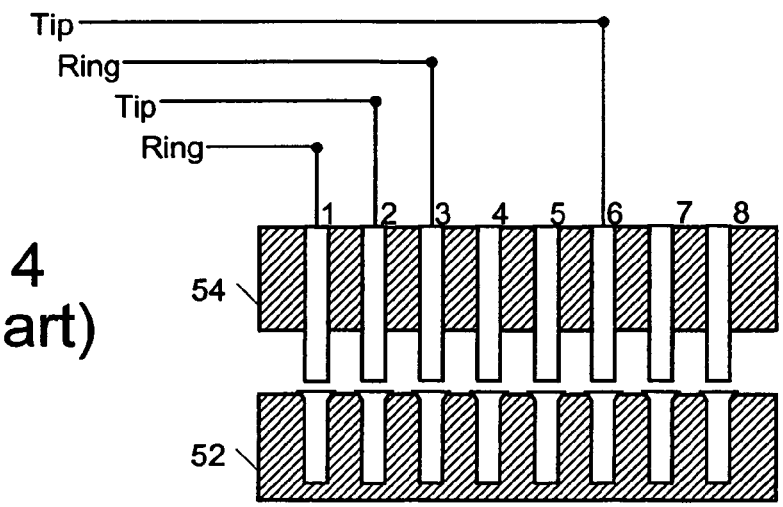
FIG. 4 is a simplified representation of a conventional telephone connector such as the widely used RJ45 telephone connector.
Figure 5:
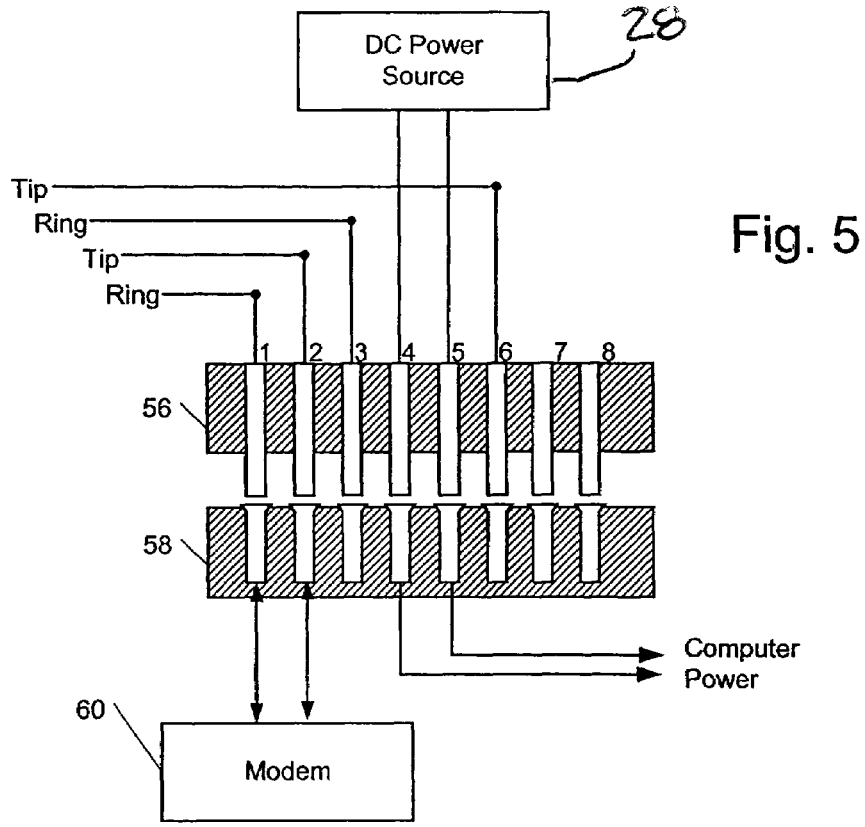
FIG. 5 is a simplified representation of an RJ45 telephone connector modified to implement the present invention.

FIG. 4 is a simplified representation of a standard RJ45 telephone connector, having a jack 52 can receive a complementary plug 54 which terminates conventional telephone twisted pair (TP) wires. It should be noted that the drawing is only a logical representation of an RJ45 connector, not a physical representation. An actual RJ45 connector is a much more complex physical structure than the structure illustrated. A standard telephony connector includes four pairs of electrical contacts. A one line telephone or standard single modem connection is connected using wires terminating at only one of the three pairs, usually the wire pair (1-2) in the plug. It is standard practice to designate the wire pair connections as "tip" and "ring" leads to identify telephony functions which are performed by signals carried on the leads. Where a two line telephone or a second telephone phone is to be installed, a second conductor (and wire) pair (usually 3-6) is used. The third and fourth conductor pairs are rarely used for any purpose. Many conventional telephone cables don't even include wires connected to the third and fourth conductor pairs. In the environment illustrated in FIG. 1, it is likely that only a third conductor/wire pair (4-5) would be used to establish a data connection to an in-vehicle network switch.

The present invention capitalizes on the fact that the wire pair (4-5) in a standard RJ45 connector is rarely used. The invention appropriates that wire pair to provide an electrical connection between the DC power source 28 and a plug 56. A complementary jack 58 includes a conventional wire pair (1-2) connection to an internal or pluggable modem 60, but also includes an unconventional wire pair (4-5) connection. This wire pair is used to carry DC power to the computer's DC power subsystem. The amount of DC power that can be transported over telephone twisted pair wiring is great enough to supply the power needs of the mobile computer system and may be sufficient to trickle-charge the computer's battery even while the computer is in active use.

Figure 6:
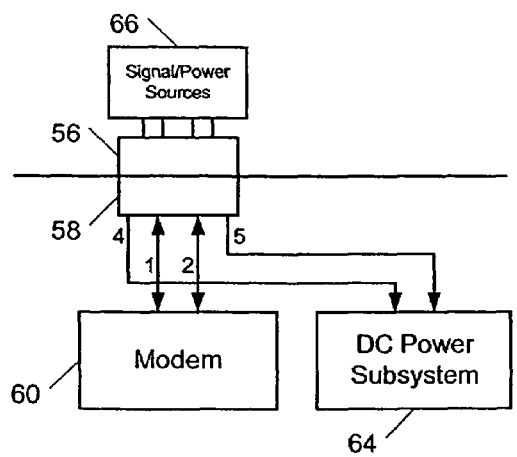
FIG. 6 represents one embodiment for an electrical interface between a modified RJ45 telephone connector and the DC power subsystem of a computer.

FIG. 6 depicts a first specific embodiment of the invention. In that Figure, the network connection and the DC power source are represented generically as a signal/power source 66. In this embodiment, the wire-pair 4-5 is connected directly to the DC power subsystem 64 of the computer. This embodiment assumes, of course, that the computer was initially designed to support such a direct connection.

Figure 7:
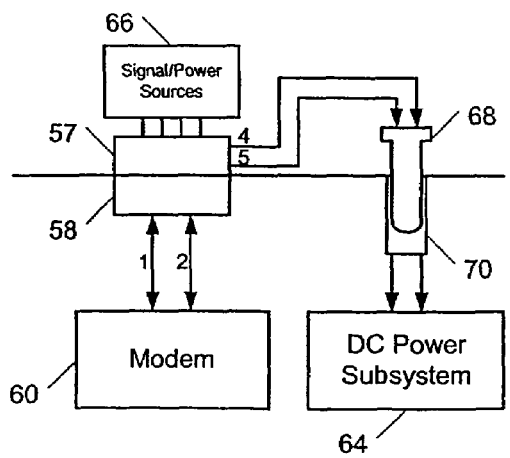
FIG. 7 represents an alternate embodiment for an electrical interface between a modified RJ45 telephone connector and the DC power subsystem of a computer.

FIG. 7 depicts a second specific embodiment which would permit the invention to be used with currently available mobile computers. In the second embodiment, the plug to be inserted into the computer telephone jack is modified to carry a pair of electrical leads which are terminated in a DC power plug 68 of the type already commonly found on mobile computers. DC power would be transferred to the computer's DC power subsystem 64 using the DC power plug 68 and a complementary jack 70 in exactly the same way those components are normally used to transfer power provided by an AC adapter. The advantage of this embodiment is that no changes are required within the computer itself in order to make use of the invention.

While there have been described what are considered to be preferred embodiments of the present invention, variations and modifications in the preferred embodiments will occur to those skilled in the art once they are made aware of the invention. As just one example, the invention could readily be used with telephony connectors other than the standard RJ45 connector. Therefore, it is intended that the appended claims shall be construed to include not only the preferred embodiments but all such variations and modifications that fall within the true spirit and scope of the invention.

What is claimed is:

1. For use in a system having a data connection to an external network device through a first pair of wires of a multi-wire telephone connector of the type having a second pair of wires, the system further having an alternate DC power source electrically coupled to the second pair of wires, a computer having a DC power subsystem, a modem which can be connected to the external network device through the first pair of wires in the multi-wire telephone connector, and a pair of electrical leads connected at a first end to said second pair of wires in the multi-wire telephone connector and coupled at a second end to an electrical interface to the DC power subsystem, the first pair of wires only for conducting data and the second pair of wires only for conducting DC power.

2. A computer as defined in claim 1 wherein the electrical interface to the DC power subsystem includes an electrical socket and said second end of said pair of electrical leads includes a DC power supply plug capable of insertion into said electrical socket.

3. A system comprising:

a computer having a DC power subsystem, a modem and a first multi-wire telephone connector, said first multi-wire telephone connector having a first set of electrical leads coupled to the DC power subsystem to enable external DC power to be applied to the DC power subsystem through a first set of contacts in said first multi-wire telephone connector, said first multi-wire telephone connector having a second set of electrical leads coupled to the modem to enable the communication of data through a second set of contacts in said first multi-wire telephone connector;

an external network connection;

a DC power source; and a power and data distribution system for connecting the DC power source to a first set of contacts in a second multi-wire telephone connector complementary to the first multi-wire telephone connector and for connecting the external network connection to a second set of contacts in the second multi-wire connector;

wherein only DC power is conducted through the first set of contacts of said first and second multi-wire telephone connectors, and only data is conducted through the second set of contacts of said first and second multi-wire telephone connectors.

4. A system as defined in claim 3 wherein said first set of electrical leads includes an electrical plug and said DC power subsystem further includes a DC power supply jack connectable to said electrical plug.

* * * * *